United States Patent
Liu et al.

(10) Patent No.: US 11,419,174 B2
(45) Date of Patent: Aug. 16, 2022

(54) CONNECTION RECOVERY METHOD FOR RECOVERING A CONNECTION BETWEEN A COMMUNICATIONS APPARATUS AND A DATA NETWORK AND THE ASSOCIATED COMMUNICATIONS APPARATUS

(71) Applicant: MEDIATEK INC., Hsin-Chu (TW)

(72) Inventors: Ren-Huang Liu, Hsinchu (TW); Chien-Chun Huang-Fu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 252 days.

(21) Appl. No.: 16/742,918

(22) Filed: Jan. 15, 2020

(65) Prior Publication Data

US 2020/0275511 A1 Aug. 27, 2020

Related U.S. Application Data

(60) Provisional application No. 62/810,424, filed on Feb. 26, 2019.

(51) Int. Cl.
| | |
|---|---|
| *H04W 76/19* | (2018.01) |
| *H04W 76/18* | (2018.01) |
| *H04W 88/02* | (2009.01) |
| *H04W 80/10* | (2009.01) |
| *H04W 8/08* | (2009.01) |

(52) U.S. Cl.
CPC .............. *H04W 76/19* (2018.02); *H04W 8/08* (2013.01); *H04W 76/18* (2018.02); *H04W 80/10* (2013.01); *H04W 88/023* (2013.01)

(58) Field of Classification Search
None
See application file for complete search history.

(56) References Cited

U.S. PATENT DOCUMENTS

| | | | |
|---|---|---|---|
| 2016/0066231 A1 | 3/2016 | Zembutsu | |
| 2018/0376444 A1* | 12/2018 | Kim | H04W 4/70 |
| 2019/0349849 A1* | 11/2019 | Kavuri | H04W 36/0022 |
| 2019/0394833 A1* | 12/2019 | Talebi Fard | H04W 60/00 |
| 2020/0120585 A1* | 4/2020 | Kumar | H04W 8/08 |
| 2020/0396587 A1* | 12/2020 | Kim | H04W 8/12 |

FOREIGN PATENT DOCUMENTS

| | | |
|---|---|---|
| CN | 102017709 A | 4/2011 |
| EP | 3 340 690 A1 | 6/2018 |
| KR | 10-2016-0114193 | 10/2016 |
| WO | 2018/170703 A1 | 9/2018 |

* cited by examiner

*Primary Examiner* — Saumit Shah
(74) *Attorney, Agent, or Firm* — Winston Hsu

(57) ABSTRACT

A connection recovery method for recovering a connection between a communications apparatus and a data network includes: receiving a first message indicating a non-3GPP access from the 3GPP network device in a CM-IDLE state in the non-3GPP access network; transmitting a second message to the 3GPP network device via 5GMM protocol over 3GPP control plane to establish the user plane resources for the non-3GPP PDU session; receiving a third message indicating that the user plane resources cannot be reestablished; and transmitting to the 3GPP network device a service request message via the 5GMM protocol over the 3GPP Internet PDU session of 3GPP user plane to reestablish the user plane resources, or a PDU session establishment request message via 5GSM protocol over the 3GPP control plane to handover the non-3GPP PDU session from the non-3GPP access network to the 3GPP access network in response to the third message.

16 Claims, 13 Drawing Sheets

CONNECTION RECOVERY METHOD FOR RECOVERING A CONNECTION BETWEEN A COMMUNICATIONS APPARATUS AND A DATA NETWORK AND THE ASSOCIATED COMMUNICATIONS APPARATUS

CROSS REFERENCE TO RELATED APPLICATIONS

This application claims the benefit of U.S. Provisional Application No. 62/810,424 filed 2019 Feb. 26, the entirety of which is incorporated by reference herein.

BACKGROUND

Long Term Evolution (LTE) is a set of enhancements to the Universal Mobile Telecommunications System (UMTS) mobile standard promulgated by 3rd generation partnership project (3GPP) for enabling high-speed packet communications. After LTE, 5G (fifth generation) New Radio (NR) is a new Radio Access Technology (RAT) developed by 3GPP for the 5G mobile network. The terminologies 3GPP access or 3GPP Radio Access Technology (RAT) may thus refer to the access technology or the RAT that is/are promulgated or developed by 3GPP.

Nowadays, a user equipment (UE) is capable of providing Internet access via both 3GPP RAT and non-3GPP RAT, such as the WiFi or wireless local access network (WLAN). Generally, the non-3GPP access has a limited communication distance as compared to the 3GPP access. When the UE is leaving the coverage area of a non-3GPP access node (such as a WiFi Access Point), the UE has no Access Network (AN) signaling connection and enters the Connection Management (CM)-IDLE state in the non-3GPP access network. At this time when the UE is in the CM-IDLE state in the non-3GPP access network and when there is any non-3GPP data packet to be transferred from the Data Network (DN) to the UE, the UE has to try to establish user-plane resources over 3GPP access.

However, the user-plane resources establishment may fail. If the user-plane resources cannot be established over the 3GPP access, the UE cannot receive the downlink non-3GPP data packet over the 3GPP access, which may cause bad user experience to the UE owner.

SUMMARY

It is an objective of the invention to provide a connection recovery method and an associated communications apparatus, in order to solve the above problems.

An embodiment of the invention provides a communications apparatus comprising a transceiver and a processor. The transceiver is configured to transmit or receive wireless signals to communicate with a 3rd generation partnership project (3GPP) network device. The processor is coupled to the transceiver and configured to perform operations comprising: establishing a 3GPP Internet Packet Data Unit (PDU) session over a 3GPP access network and a non-3GPP PDU session over a non-3GPP access network; receiving a first message indicating a non-3GPP access from the 3GPP network device in a Connection Management (CM)-IDLE state in the non-3GPP access network; transmitting a second message to the 3GPP network device via 5G Mobility Management (5GMM) protocol over 3GPP control plane to establish user plane resources for the non-3GPP PDU session over the 3GPP access network in response to the first message; receiving a third message indicating that the user plane resources for the non-3GPP PDU session over the 3GPP access network cannot be reestablished from the 3GPP network device; and transmitting to the 3GPP network device a service request message via the 5GMM protocol over the 3GPP Internet PDU session of 3GPP user plane to reestablish the user plane resources for the non-3GPP PDU session over the 3GPP access network, or a PDU session establishment request message via 5G Session Management (5GSM) protocol over the 3GPP control plane to handover the non-3GPP PDU session from the non-3GPP access network to the 3GPP access network in response to the third message.

Another embodiment of the invention provides a connection recovery method, performed by a processor of the communications apparatus, for recovering a connection between a communications apparatus and a data network after failure of establishment of user plane resources for a non-3rd generation partnership project (3GPP) Packet Data Unit (PDU) session over a 3GPP access network comprising: establishing a 3GPP Internet PDU session over the 3GPP access network and the non-3GPP PDU session over a non-3GPP access network; receiving a first message indicating a non-3GPP access from the 3GPP network device in a Connection Management (CM)-IDLE state in the non-3GPP access network; transmitting a second message to the 3GPP network device via 5G Mobility Management (5GMM) protocol over 3GPP control plane to establish the user plane resources for the non-3GPP PDU session over the 3GPP access network in response to the first message; receiving a third message indicating that the user plane resources for the non-3GPP PDU session over the 3GPP access network cannot be reestablished from the 3GPP network device; and transmitting to the 3GPP network device a service request message via the 5GMM protocol over the 3GPP Internet PDU session of 3GPP user plane to reestablish the user plane resources for the non-3GPP PDU session over the 3GPP access network, or a PDU session establishment request message via 5G Session Management (5GSM) protocol over the 3GPP control plane to handover the non-3GPP PDU session from the non-3GPP access network to the 3GPP access network in response to the third message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
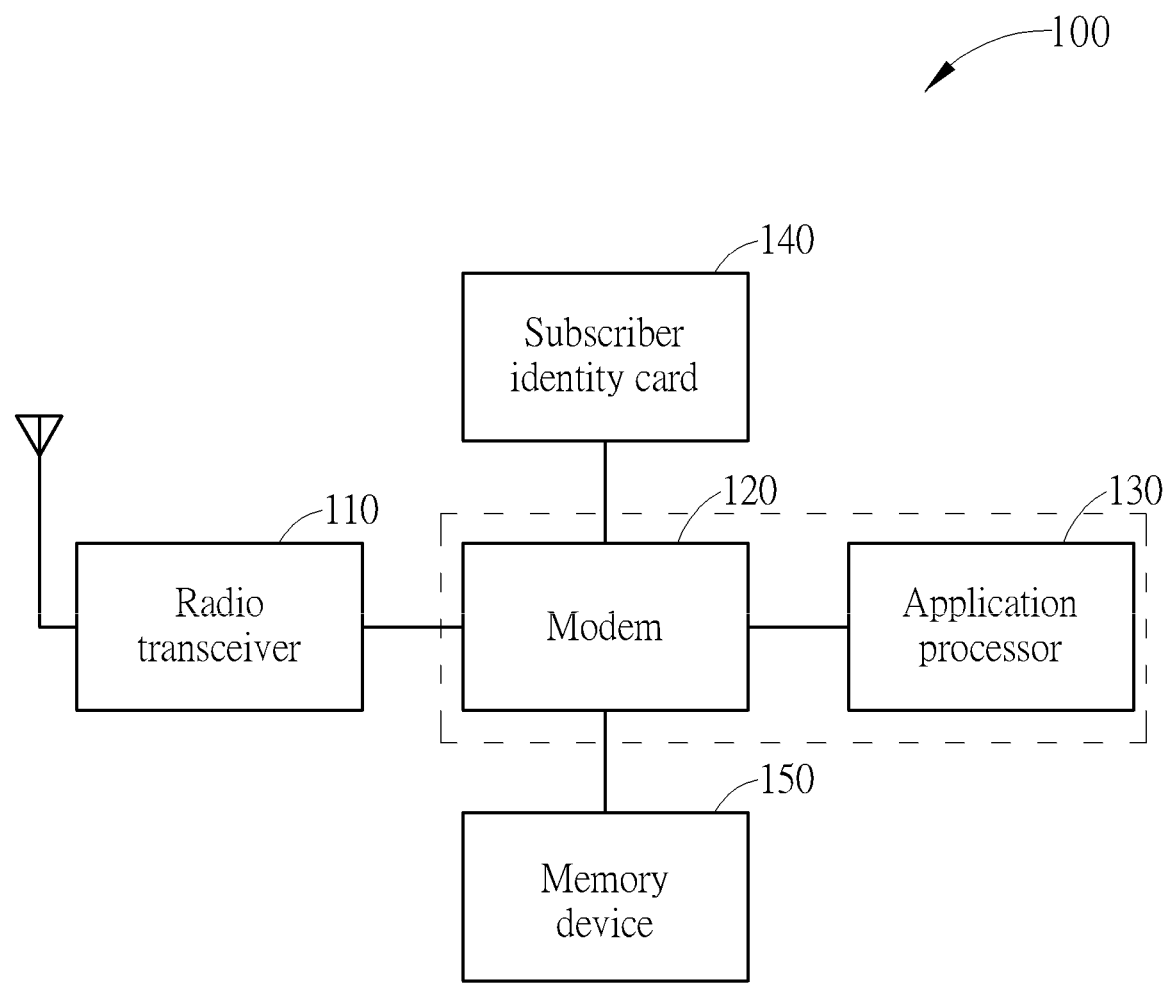
FIG. 1 shows an exemplary block diagram of a communications apparatus according to an embodiment of the invention.

FIG. 1 shows an exemplary block diagram of a communications apparatus according to an embodiment of the invention. The communications apparatus 100 may be a portable electronic device, such as a Mobile Station (MS, which may be interchangeably referred to as User Equipment (UE)). The communications apparatus 100 may comprise at least an antenna module comprising at least one antenna, a radio transceiver 110, a modem 120, an application processor 130, a subscriber identity card 140, and a memory device 150. The radio transceiver 110 may receive wireless radio frequency signals from an air interface via the antenna module, transmit wireless radio frequency signals to the air interface via the antenna module and perform RF signal processing. For example, the radio transceiver 110 may convert the received signals into intermediate frequency (IF) or baseband signals to be processed, or receive the IF or baseband signals from the modem 120 and convert the received signals into wireless radio frequency signals to be transmitted to a 3GPP network device in a 3GPP access network (e. g. a cellular network) and/or convert the received signals into wireless radio frequency signals to be transmitted to a non-3GPP network device in a non-3GPP access network. According to an embodiment of the invention, the 3GPP network device may be a cell, a node B, an evolved node B (eNB), a g node B (gNB), a base station, a Mobility Management Entity (MME), an Access and Mobility Management Function (AMF) device, etc., at the network side of the 3GPP access network and communicating with the communications apparatus 100 via the wireless radio frequency signals, and the non-3GPP network device may be a non-3GPP Access Point (AP).

The radio transceiver 110 may comprise a plurality of hardware devices to perform radio frequency conversion and RF signal processing. For example, the radio transceiver 110 may comprise a power amplifier for amplifying the RF signals, a filter for filtering unwanted portions of the RF signals and/or a mixer for performing radio frequency conversion. According to an embodiment of the invention, the radio frequency may be, for example, the frequency of any specific frequency band for a LTE system, or the frequency of any specific frequency band for a 5G NR system, the frequency of any specific frequency band for a WiFi system, etc.

The modem 120 may be configured to handle corresponding communications protocol operations and processing the IF or baseband signals received from or to be transmitted to the radio transceiver 110. The application processor 130 is configured to run the operating system of the communications apparatus 100 and run application programs installed in the communications apparatus 100. In the embodiments of the invention, the modem 120 and the application processor 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a SIM, USIM, R-UIM or CSIM card, or the like and may typically contain user account information, an International Mobile Subscriber Identity (IMSI) and a set of SIM application toolkit (SAT) commands and may provide storage space for phone book contacts. The memory device 150 may be coupled to the modem 120 and application processor 130 and may store system data or user data.

It should be noted that, in order to clarify the concept of the invention, FIG. 1 presents a simplified block diagram in which only the elements relevant to the invention are shown. For example, in some embodiments of the invention, the communications apparatus may further comprise some peripheral devices not shown in FIG. 1. In another example, in some embodiments of the invention, the communications apparatus may further comprise a central controller coupled to the modem 120 and the application processor 130. Therefore, the invention should not be limited to what is shown in FIG. 1. In yet another example, in some embodiments of the invention, the communications apparatus may further comprise more than one modem and/or more than one radio transceiver for supporting both the 3GPP network access for communicating with at least one 3GPP network device and the non-3GPP network access for communicating with at least one non-3GPP network device.

In some embodiments of the invention, the communications apparatus is capable of supporting multiple 3GPP radio access technologies (RATs) communications via the single-card structure as shown in FIG. 1. It should be noted that, although FIG. 1 shows a single-card application, the invention should not be limited thereto. For example, in some embodiments of the invention, the communications apparatus may comprise multiple subscriber identity cards (multi-cards) to support the multi-RATs communications, in either a single-standby or a multiple-standby manner. In the multi-RATs communications applications, the modem, the radio transceiver and/or the antenna module may be shared by the subscriber identity card(s) and may have the capability of handling the operations of different 3GPP RATs and processing the corresponding RF, IF or baseband signals in compliance with the corresponding 3GPP communications protocols.

In addition, those who are skilled in this technology can still make various alterations and modifications based on the descriptions given above to derive the communications apparatuses comprising multiple radio transceivers and/or multiple antenna modules for supporting multiple 3GPP RAT wireless communications without departing from the scope and spirit of this invention. Therefore, in some embodiments of the invention, the communications apparatus may be designed to support the multi-cards application, in either a single-standby or a multiple-standby manner, by making some alterations and modifications.

It should be further noted that the subscriber identity card 140 may be dedicated hardware cards as described above, or in some embodiments of the invention, there may be individual identifiers, numbers, addresses, or the like which are burned in the internal memory device of the corresponding modem and are capable of identifying the communications apparatus. Therefore, the invention should not be limited to what is shown in the figures.

It should be further noted that in some embodiments of the invention, the communications apparatus may further support multiple IMSIs.

Figure 2:
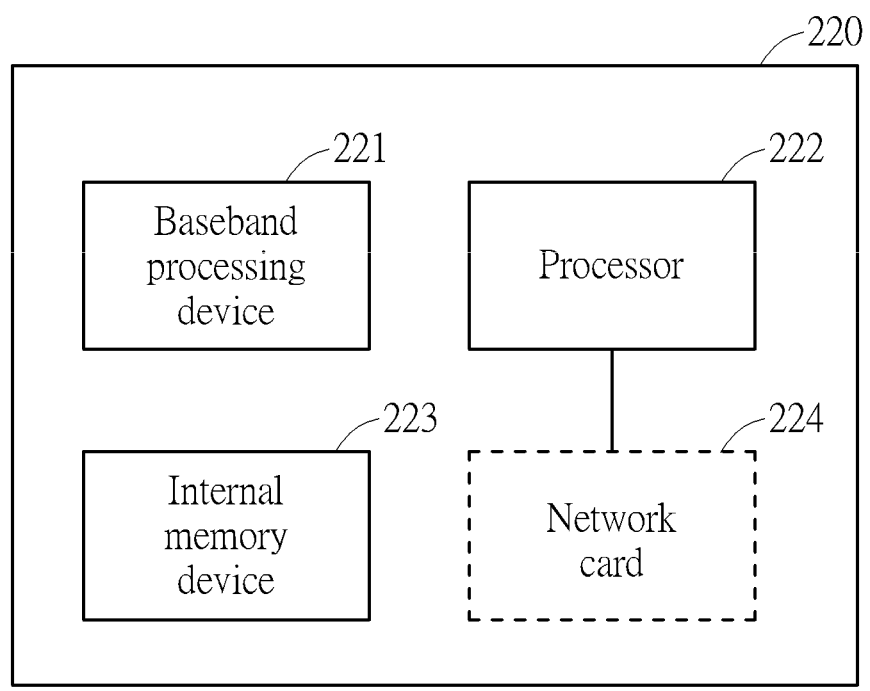
FIG. 2 shows an exemplary block diagram of a modem according to an embodiment of the invention.

FIG. 2 shows an exemplary block diagram of a modem according to an embodiment of the invention. The modem 220 may be the modem 120 shown in FIG. 1 and may comprise at least a baseband processing device 221, a processor 222, an internal memory device 223 and a network card 224. The baseband processing device 221 may receive the IF or baseband signals from the radio transceiver 110 and perform IF or baseband signal processing. For example, the baseband processing device 221 may convert the IF or baseband signals into a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, an encoder for signal encoding, a decoder for signal decoding, and so on.

According to an embodiment of the invention, the baseband processing device 221 may be designed to have the capability of handling the baseband signal processing operations for different 3GPP RATs and processing the corresponding IF or baseband signals in compliance with the corresponding 3GPP communications protocols, so as to support the multi-RATs wireless communications, and/or be designed to have the capability of handling the baseband signal processing operations for the non-3GPP RAT and processing the corresponding IF or baseband signals in compliance with the corresponding non-3GPP communications protocols, so as to support the non-3GPP wireless communications.

According to another embodiment of the invention, the baseband processing device 221 may comprise a plurality of sub-units, each being designed to have the capability of handling the baseband signal processing operations of one or more specific RATs and processing the corresponding IF or baseband signals in compliance with the corresponding communications protocols, so as to support the multi-RATs wireless communications. Therefore, the invention should not be limited to any specific way of implementation.

The processor 222 may control the operations of the modem 220. According to an embodiment of the invention, the processor 222 may be arranged to execute the program codes of the corresponding software module of the modem 220. The processor 222 may maintain and execute the individual tasks, threads, and/or protocol stacks for different software modules. In a preferred embodiment, a protocol stack may be implemented so as to respectively handle the radio activities of one RAT (e.g. a non-3GPP RAT or a 3GPP RAT). However, it is also possible to implement more than one protocol stack to handle the radio activities of one RAT at the same time, or implement only one protocol stack to handle the radio activities of more than one RAT at the same time, and the invention should not be limited thereto.

The processor 222 may also read data from the subscriber identity card coupled to the modem, such as the subscriber identity card 140, and write data to the subscriber identity card. The internal memory device 223 may store system data and user data for the modem 220. The processor 222 may also access the internal memory device 223.

The network card 224 provides Internet access services for the communications apparatus. It should be noted that, although the network card 224 shown in FIG. 2 is configured inside of the modem, the invention should not be limited thereto. In some embodiments of the invention, the communications apparatus may also comprise a network card configured outside of the modem, or the communications apparatus may also be coupled to an external network card for providing Internet access services. In some embodiments of the invention, the network card 224 may be a virtual network card, instead of a tangible card, that is created by the operating system of the communications apparatus 100. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be further noted that in some embodiments of the invention, the modem may also comprise more than one processor and/or more than one baseband processing device. For example, the modem may comprise multiple processors and/or multiple baseband processing devices for supporting multi-RATs (including the non-3GPP RAT and 3GPP RAT) operations. Therefore, the invention should not be limited to what is shown in FIG. 2.

It should be further noted that in some embodiments of the invention, the baseband processing device 221 and the processor 222 may be integrated into one processing unit, and the modem may comprise one or multiple such processing units, for supporting multi-RATs (including the non-3GPP RAT and 3GPP RAT) operations. Therefore, the invention should not be limited to what is shown in FIG. 2.

Figure 3:
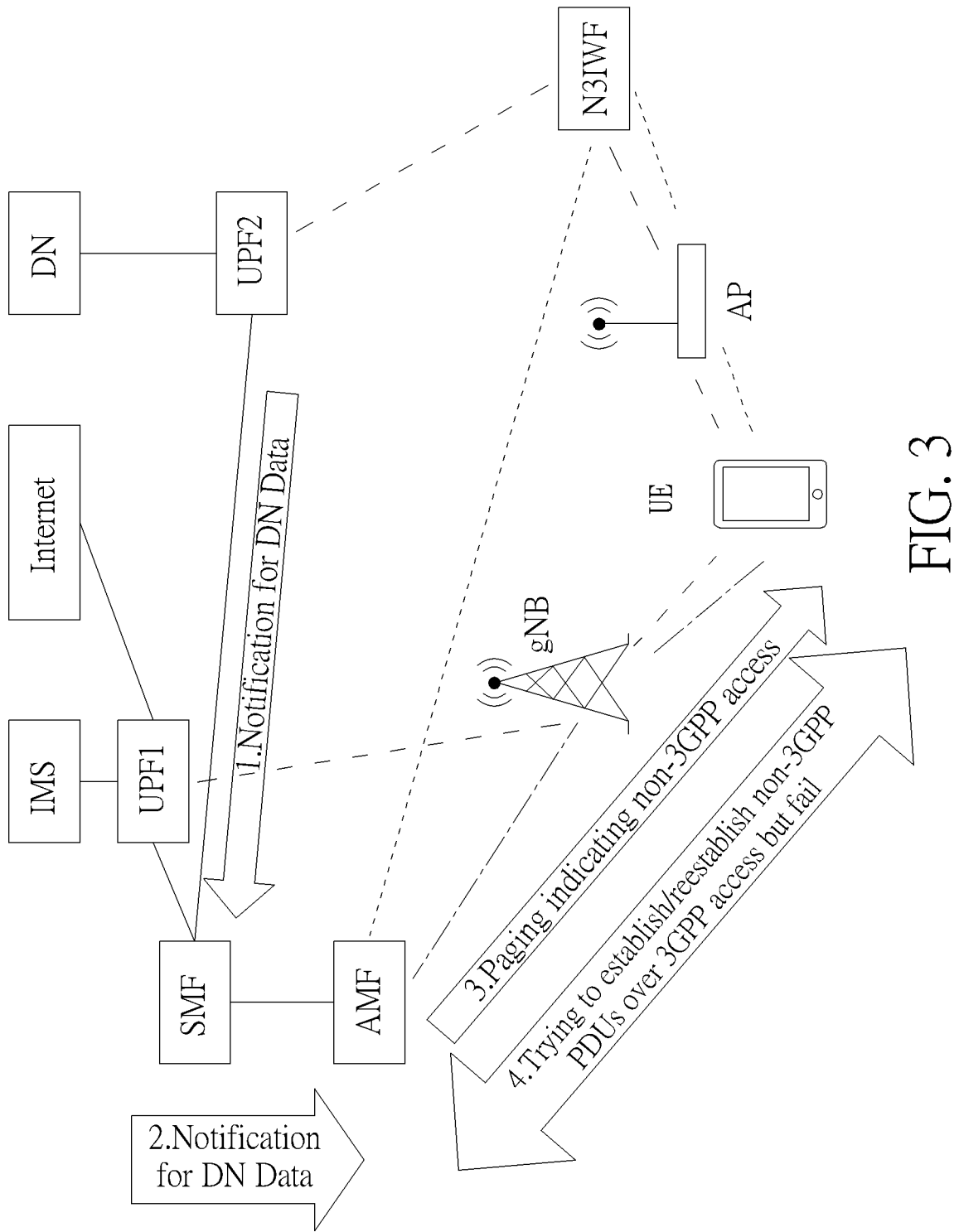
FIG. 3 is a schematic diagram showing an exemplary scenario of establishing user plane resources for a non-3GPP PDU session over the 3GPP access network.

FIG. 3 is a schematic diagram showing an exemplary scenario of establishing user plane resources for a non-3GPP PDU session over the 3GPP access network. Suppose that a communications apparatus (such as the UE shown in FIG. 3) has established one or more 3GPP Packet Data Unit (PDU) sessions over a 3GPP access network and has also established one or more non-3GPP PDU sessions over a non-3GPP access network. The 3GPP PDU sessions may be established via the gNB and the non-3GPP PDU sessions may be established via the AP.

In the scenario shown in FIG. 3, the UE has been registered in both the 3GPP and non-3GPP access networks and is in CM-IDLE state in both 3GPP and non-3GPP access networks. It should be noted that an Access Network (AN) connection is a Radio Resource Control (RRC) connection over the 3GPP access network or an UE-N3IWF connection over the non-3GPP access network, where the N3IWF is the abbreviation for the terminology "Non-3GPP Inter Working Function". The UE in the CM-IDLE state in the non-3GPP access network has no AN signaling connection (for example, the AN signaling connection has been released) with the N3IWF device, and the UE in the CM-IDLE state in the 3GPP access network has no NAS signaling connection with the AMF device.

Reachability management is responsible for detecting whether the UE is reachable and providing UE location (i.e. access node) for the network to reach the UE. In the 3GPP access, this is done by paging UE (note that the UE cannot be paged over the non-3GPP access). Therefore, when the UE is in the CM-IDLE state in the non-3GPP access network and when there is any non-3GPP data packet to be transferred from the Data Network (DN) to the UE, a notification for the DN data will be transmitted from the User Plane Function (UPF) device UPF2 to the Session Management Function (SMF) device (shown as the first step in FIG. 3), then from the SMF device to the AMF device (shown as the second step in FIG. 3), and then the AMF device will page the UE (shown as the third step in FIG. 3).

Generally, when the AMF device receives a message with a non-3GPP access type indication from the SMF device for a non-3GPP PDU Session corresponding to the UE that is CM-IDLE state for non-3GPP access, the AMF device sends a paging message with an access type indicating a non-3GPP access over the 3GPP access to the UE. In response to the paging message, the UE may transmit a registration request message or a service request message to the 3GPP network device via 5G Mobility Management (5GMM) protocol over 3GPP control plane to reestablish user plane resources for the non-3GPP PDU session over the 3GPP access network. For example, the UE may include the "Allowed PDU session status" information element (IE), which carries an identity of the non-3GPP PDU session to be reestablished, in the registration request message or the service request message to indicate the PDU session for which the UE allows to establish/reestablish the user-plane resources over the 3GPP access.

If the user-plane resources cannot be reestablished over the 3GPP access, the AMF device will send a registration accept message or a service accept message with the PDU session reactivation result IE indicating that the user-plane resources for the corresponding PDU session cannot be reestablished (shown as the fourth step in FIG. 3).

Figure 4:
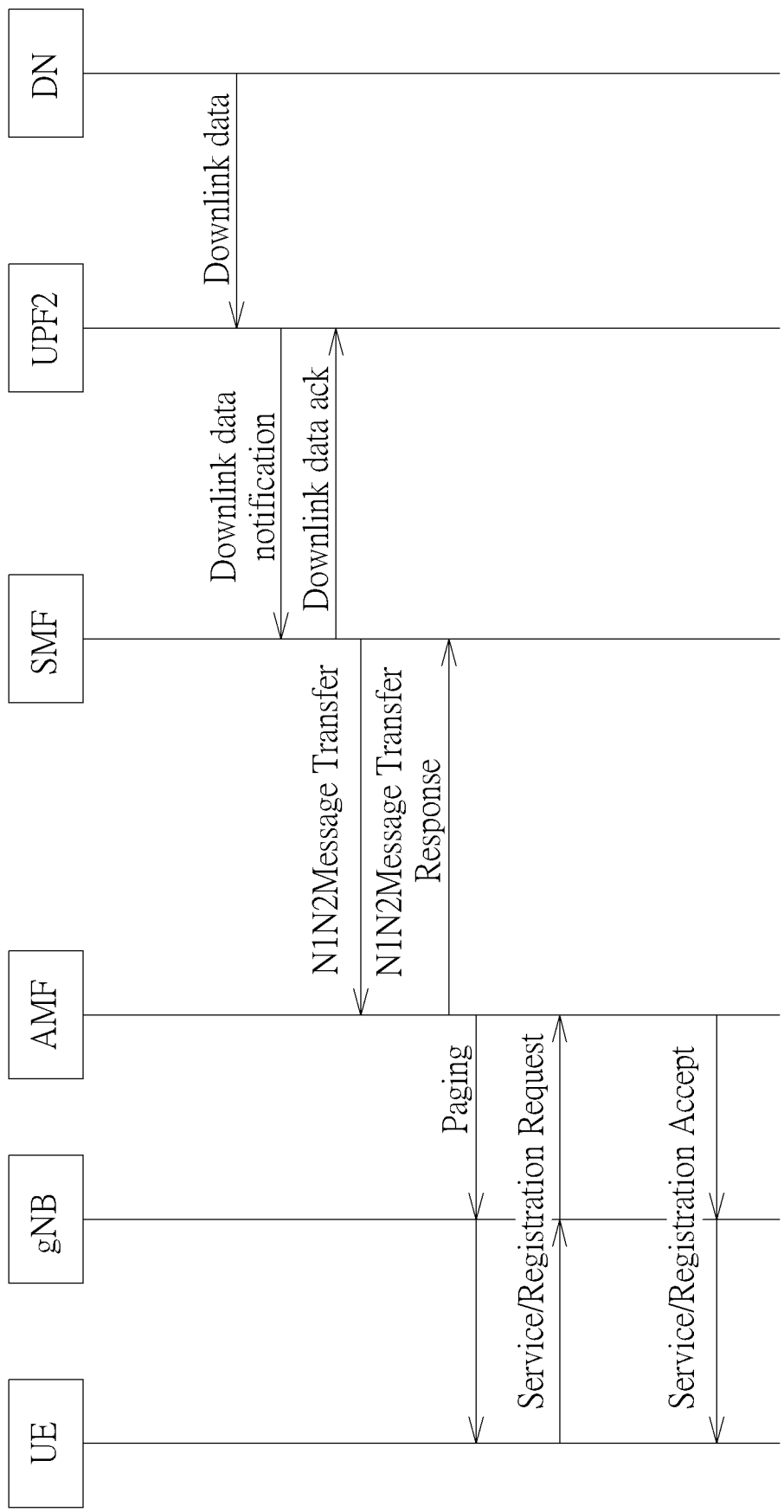
FIG. 4 is a flow chart showing the message flow in exemplary scenario shown in FIG. 3.

For better comprehension, FIG. 4 is a message flow chart showing the messages transmitted in the 3GPP access network in exemplary scenario shown in FIG. 3. It should be noted that for details of service request procedure, reference may be made to 3GPP TS 23.502, FIG. 4.2.3.2-1, and for details of registration procedure, reference may be made to 3GPP TS 23.502, FIG. 4.2.2.2.2-1.

Figure 5:
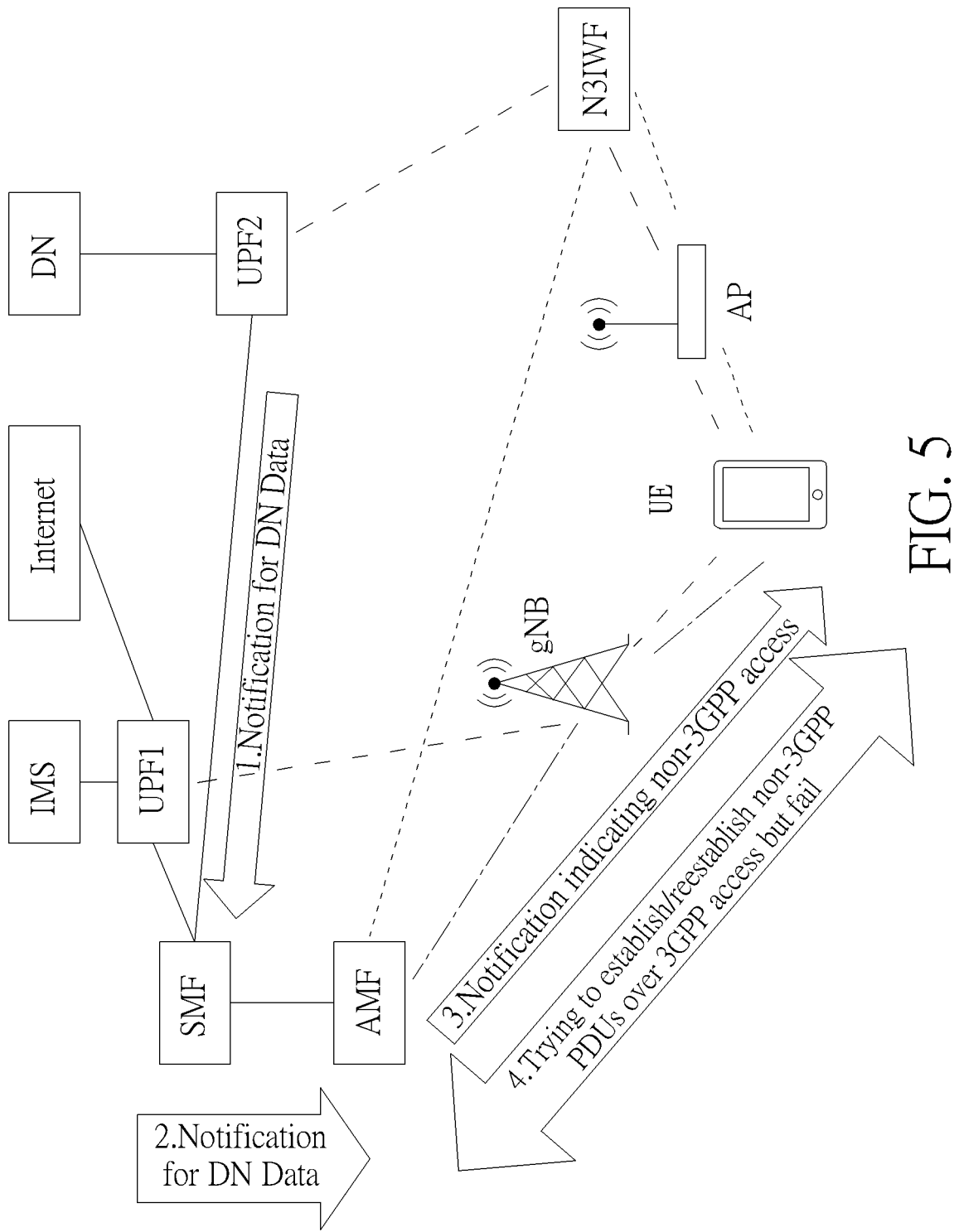
FIG. 5 is a schematic diagram showing an exemplary scenario of establishing user plane resources for a non-3GPP PDU session over the 3GPP access network.

FIG. 5 is a schematic diagram showing another exemplary scenario of establishing user plane resources for a non-3GPP PDU session over the 3GPP access network. Suppose that a communications apparatus (such as the UE shown in FIG. 5) has established one or more 3GPP PDU sessions over a 3GPP access network and has also established one or more non-3GPP PDU sessions over a non-3GPP access network. The 3GPP PDU sessions may be established via the gNB and the non-3GPP PDU sessions may be established via the AP.

Different from the scenario shown in FIG. 3, in the scenario shown in FIG. 5, the UE has been registered in both the 3GPP and non-3GPP access networks and is in CM-IDLE state in the non-3GPP access network and in CM-CONNECTED state in the 3GPP access network. Note that a UE in CM-CONNECTED state has a NAS signaling connection with the AMF device.

When the AMF device receives a message with a non-3GPP access type indication from the SMF device for a non-3GPP PDU session corresponding to the UE that is CM-CONNECTED state for 3GPP access, the AMF device sends a notification message with an access type indicating a non-3GPP access over the 3GPP access to the UE. Therefore, different from the schematic diagram shown in FIG. 3, a notification instead of a paging is transmitted from the AMF device to the UE in FIG. 5.

In response to the notification message, the UE may transmit a service request message to the 3GPP network device via 5G Mobility Management (5GMM) protocol over 3GPP control plane to reestablish user plane resources for the non-3GPP PDU session over the 3GPP access network. For example, the UE may include the "Allowed PDU session status" IE, which carries an identity of the non-3GPP PDU session to be reestablished, in the service request message to indicate the PDU session for which the UE allows to reestablish the user-plane resources over the 3GPP access.

If the user-plane resources cannot be reestablished over the 3GPP access, the AMF device will send a service accept message with the PDU session reactivation result IE indicating that the user-plane resources for the corresponding PDU session cannot be reestablished.

Figure 6:
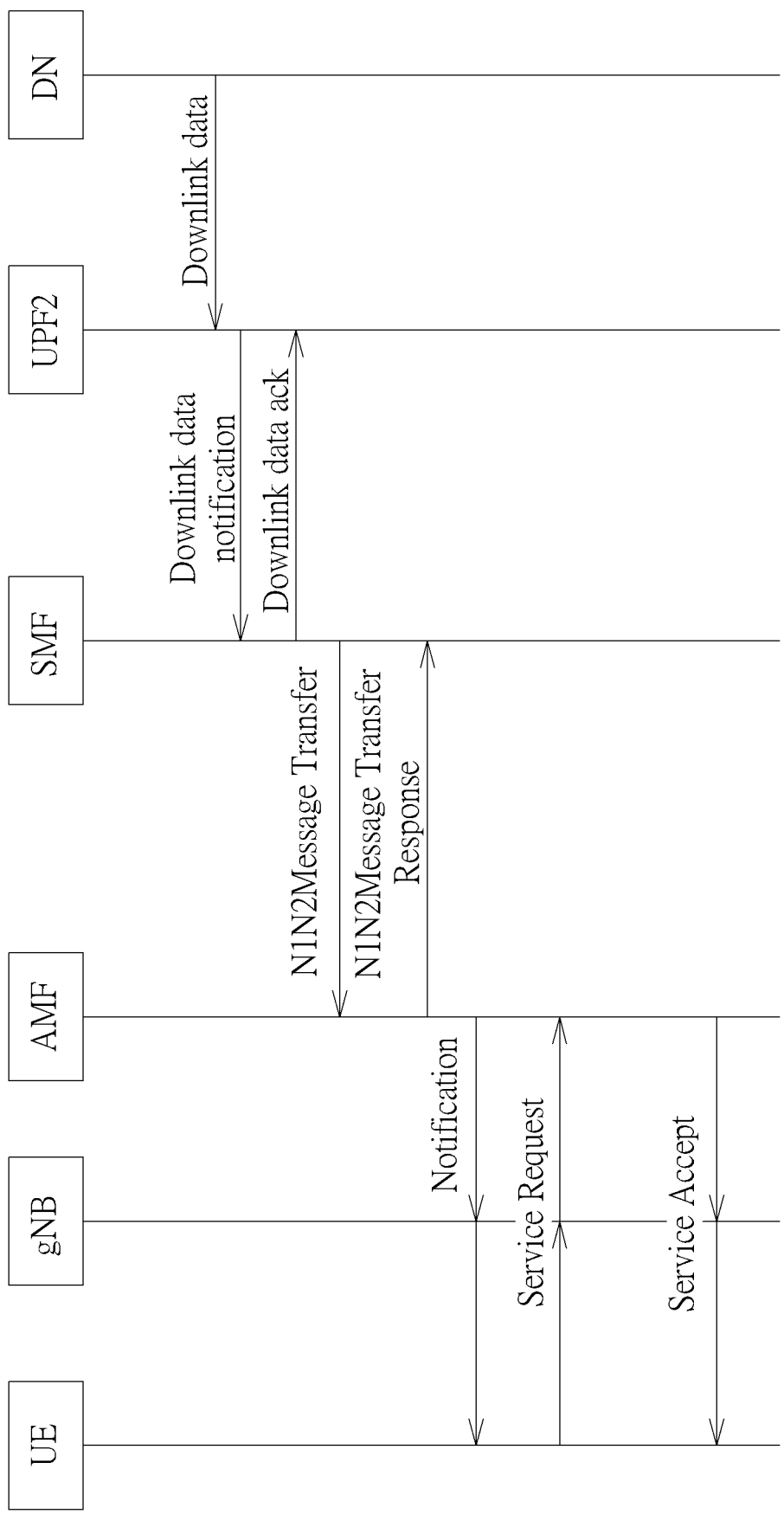
FIG. 6 is a flow chart showing the message flow in exemplary scenario shown in FIG. 5.

For better comprehension, FIG. 6 is a message flow chart showing the messages transmitted in the 3GPP access network in exemplary scenario shown in FIG. 5. It should be noted that for details of service request procedure, reference may be made to 3GPP TS 23.502, FIG. 4.2.3.2-1.

In the scenarios shown in FIG. 3-FIG. 6, no matter whether the UE is in the CM-IDLE state or in the CM-CONNECTED state in the 3GPP access network, when the user-plane resources cannot be reestablished over the 3GPP access, the UE cannot receive the downlink data from non-3GPP access over the 3GPP access, and which brings bad user experiences to the user.

To solve this problem, several connection recovery methods for recovering a connection between a communications apparatus (such as the UE as discussed above) and a Data Network (DN) after failure of reestablishment of user plane resources for a non-3GPP PDU session over a 3GPP access network are proposed. In one embodiment of the invention, the connection recovery methods may be triggered responsive to reception of a message with the PDU session reactivation result IE indicating that user-plane resources for the corresponding PDU session cannot be re-established.

Figure 7:
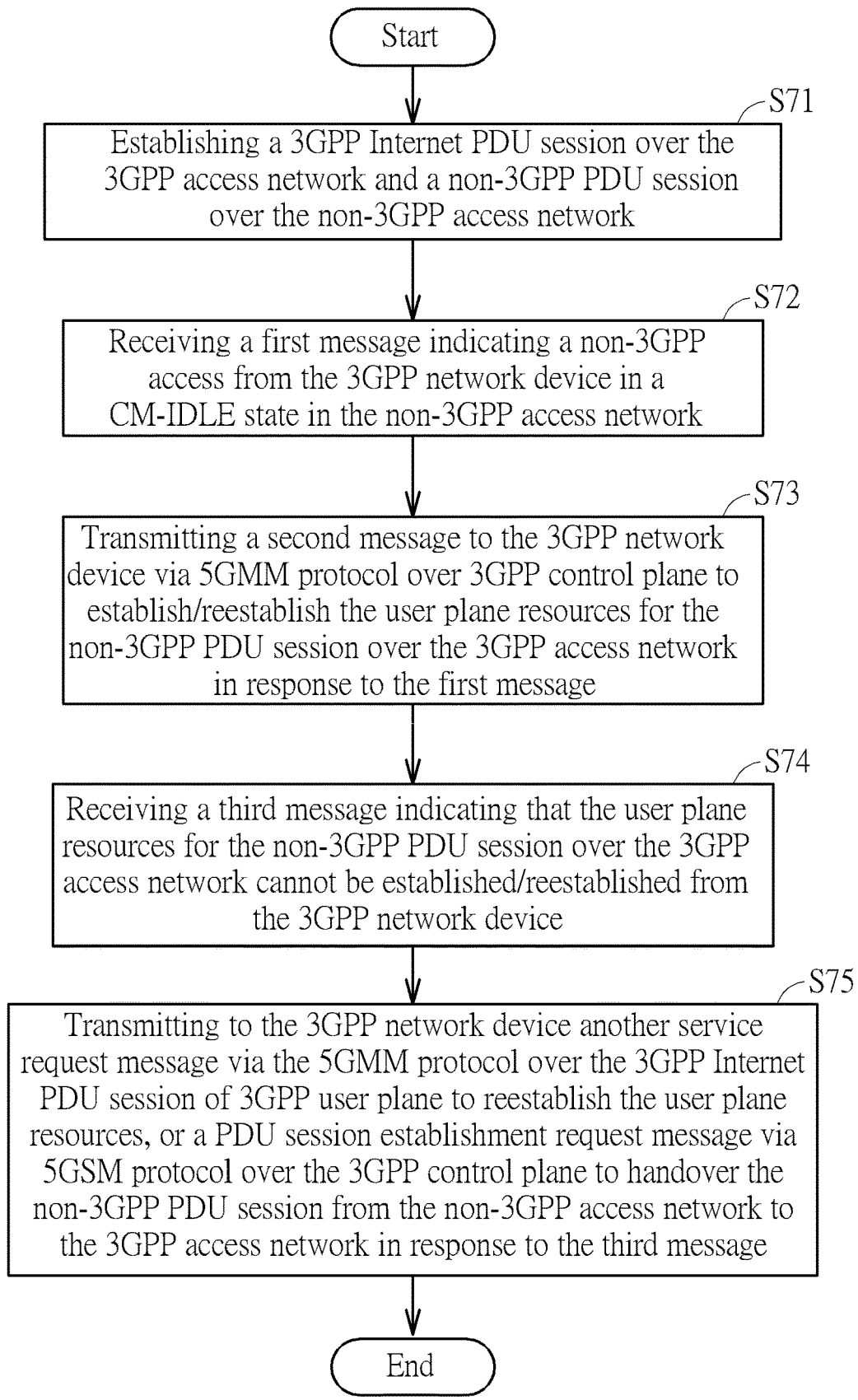
FIG. 7 is an exemplary flow chart of a connection recovery method according to an embodiment of the invention.

FIG. 7 is an exemplary flow chart of a connection recovery method according to an embodiment of the invention. The connection recovery method may be performed by a processor (e.g. the processor 222) of a communications apparatus (e.g. the communications apparatus 100 or the UE as discussed above) and may comprise:

Step S71: establishing a 3GPP Internet PDU session over the 3GPP access network and a non-3GPP PDU session over a non-3GPP access network. As discussed above, the communications apparatus may establish one or more 3GPP PDU sessions, including a 3GPP Internet PDU session, over the 3GPP access network and may also establish one or more non-3GPP PDU sessions over the non-3GPP access network.

Step S72: receiving a first message indicating a non-3GPP access from the 3GPP network device in a CM-IDLE state in the non-3GPP access network. As discussed above, the communications apparatus is in a CM-IDLE state in the non-3GPP access network when the AN signaling connection has been released. In addition, when the communications apparatus is in a CM-IDLE state in the 3GPP access network, the first message is a paging message; and when the communications apparatus is in a CM-Connected state in the 3GPP access network, the first message is a notification message.

Step S73: transmitting a second message to the 3GPP network device via 5GMM protocol over 3GPP control plane to establish/reestablish the user plane resources for the non-3GPP PDU session over the 3GPP access network in response to the first message. As discussed above, when the communications apparatus is in a CM-IDLE state in the 3GPP access network, the second message is a registration request message or a service request message; and when the communications apparatus is in a CM-Connected state in the 3GPP access network, the second message is a service request message.

Step S74: receiving a third message indicating that the user plane resources for the non-3GPP PDU session over the 3GPP access network cannot be reestablished from the 3GPP network device. As discussed above, when the communications apparatus is in a CM-IDLE state in the 3GPP access network, the third message is a registration accept message or a service accept message; and when the communications apparatus is in a CM-Connected state in the 3GPP access network, the third message is a service accept message.

Step S75: according to a first embodiment of the invention, transmitting to the 3GPP network device another service request message via the 5GMM protocol over the 3GPP Internet PDU session of 3GPP user plane to reestablish the user plane resources for the non-3GPP PDU session over the 3GPP access network in response to the third message (which will be discussed in more detailed in the following paragraphs), or, according to a second embodiment of the invention, transmitting a PDU session establishment request message via 5G Session Management (5GSM) protocol over the 3GPP control plane to handover the non-3GPP PDU session from the non-3GPP access network to the 3GPP access network in response to the third message (which will be discussed in more detailed in the following paragraphs).

It should be understood that steps S71-S73 may be regarded as the preconditions of the proposed connection recovery methods for solving the aforementioned problems. Therefore, from another aspect of view of the invention, the proposed connection recovery method may be started from the step S74 and comprise two steps S74-S75.

Figure 8:
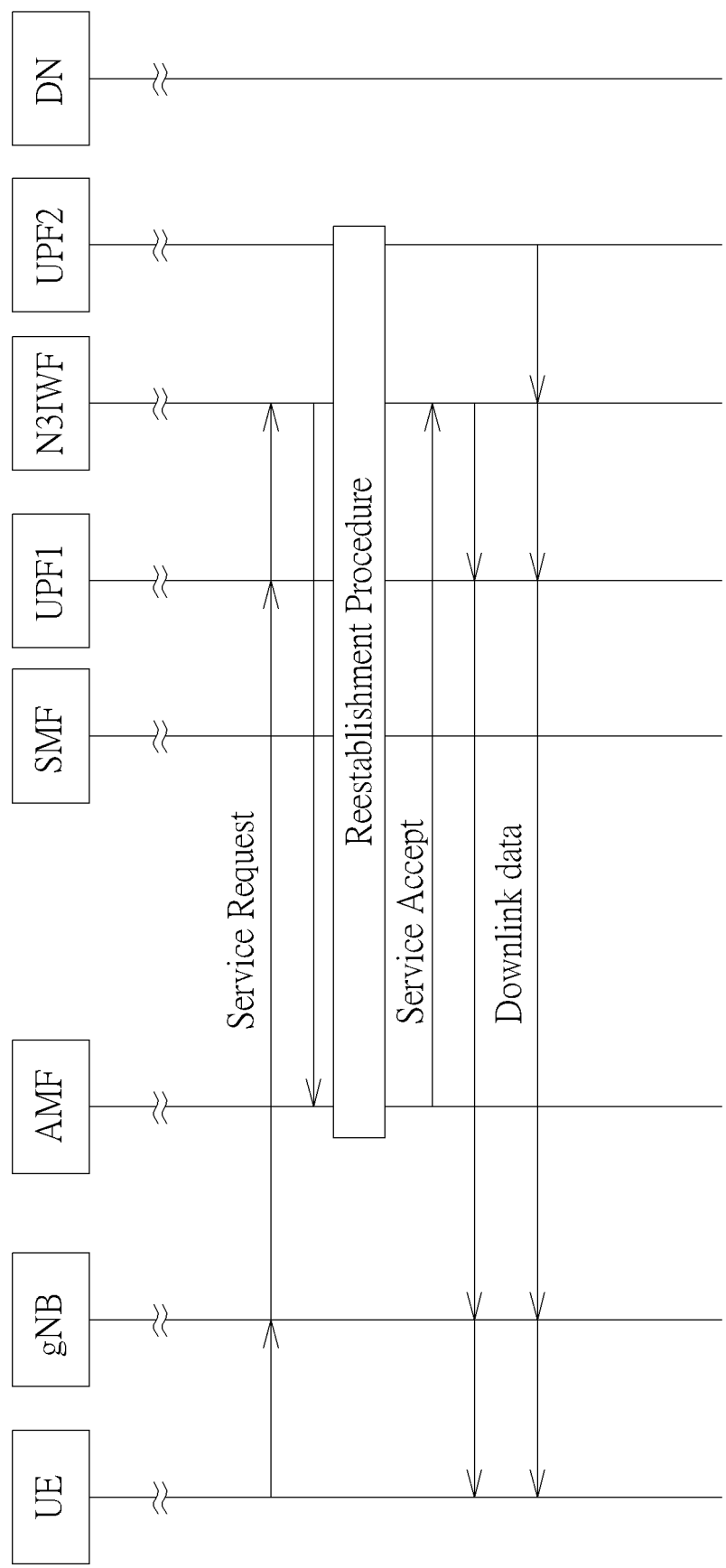
FIG. 8 is an exemplary flow chart showing the flow of the messages transmitted in the 3GPP access network for recovering a connection between the communications apparatus and the DN according to the first embodiment of the invention.
Figure 9:
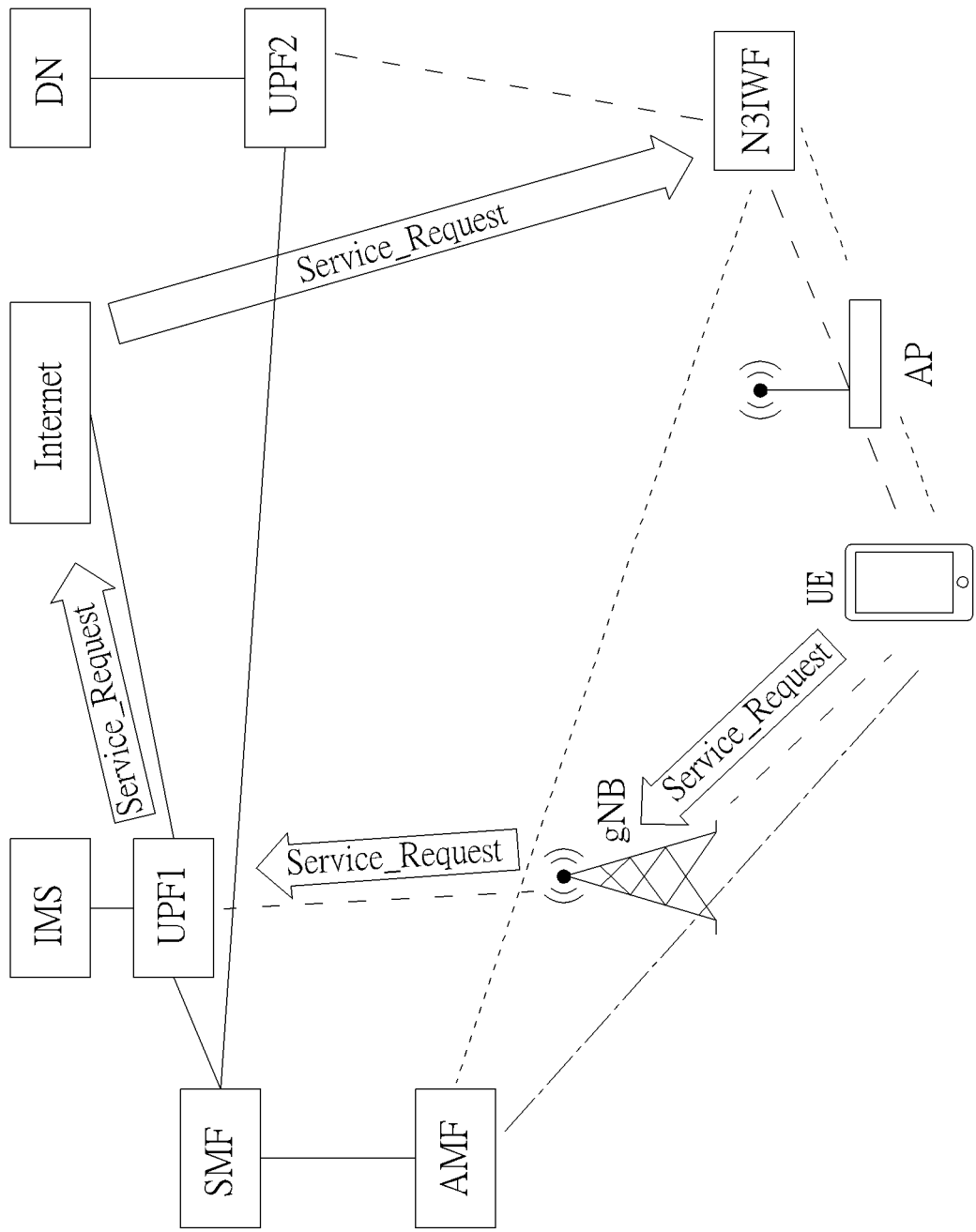
FIG. 9 is a schematic diagram showing the path for transmitting the service request message according to the first embodiment of the invention.

FIG. 8 is an exemplary flow chart showing the flow of the messages transmitted in the 3GPP access network for recovering a connection between the communications apparatus and the DN according to the first embodiment of the invention. FIG. 9 is a schematic diagram showing the path for transmitting the service request message Service_Request according to the first embodiment of the invention.

In the first embodiment of the invention, in response to the third message, the communications apparatus may transmit the service request message Service_Request via the 5GMM protocol over the 3GPP Internet PDU session of 3GPP user plane to the 3GPP network device to reestablish the user plane resources for the non-3GPP PDU session over the 3GPP access network.

It should be noted that FIG. 8 is a simplified message flow chart, in which the message flow before transmitting the service request message (e.g. the service request message in step S75 or the service request message Service_Request in FIG. 9) is omitted for brevity. Regarding the message flow before transmitting this service request message, reference may be made to FIG. 4 for the scenario when the UE is in CM-IDLE state in both 3GPP and non-3GPP access networks and made to FIG. 6 for the scenario when the UE is in CM-IDLE state in the non-3GPP access network and in CM-CONNECTED state in the 3GPP access network.

According to the first embodiment of the invention, the UE may connect to the N3IWF device to re-establish the user plane resources for the non-3GPP PDU session via the 3GPP Internet PDU session. As shown in FIG. 8 and FIG. 9, the service request message Service_Request is transmitted from the communications apparatus (e.g. the UE) to the gNB. According to the standards, the purpose of the service request is to request the establishment of user-plane resources for PDU sessions which are established without user-plane resources. The gNB transmits the service request message Service_Request to the UPF device UPF1, and then the UPF device UPF1 transmits the service request message Service_Request to the N3IWF device via the Internet. The service request message Service_Request may be transmitted via the IP security (IPsec) tunnel. The N3IWF device finally transmits the service request message Service_Request to the AMF device. Upon receiving the service request message Service_Request, the AMF device may perform corresponding reestablishment procedure to reestablish the user plane resources for the non-3GPP PDU session over the 3GPP access network as defined in 3GPP TS 23.502, FIG. 4.2.3.2-1. After performing the reestablishment procedure, the AMF device may transmit a service accept message over the 3GPP Internet PDU session via the N3IWF device to the UE and the user plane resources for the non-3GPP PDU session may be successfully reestablished. When the user plane resources for the non-3GPP PDU session are successfully reestablished, the downlink data can be transmitted over 3GPP Internet PDU session via the N3IWF device and the gNB to the UE (e.g. via the path from the DN through the UPF device UPF2, the N3IWF device, the UPF device UPF1 and the gNB, then to the UE).

According to the first embodiment of the invention, when the service request message Service_Request is transmitted to the 3GPP network device via the 5GMM protocol over the 3GPP Internet PDU session of the 3GPP user plane, the service request message Service_Request is transmitted as an internet protocol (IP) packet in the 3GPP access network.

In an embodiment of the invention, the processor 222 may set a destination IP address of the IP packet to an IP address of the N3IWF device and may create a packet filter bounded to the 3GPP Internet PDU session where IPv4 remote address is set to the IPv4 address of N3IWF device and IPv6 remote address is set to the IPv6 address of N3IWF device. The packet filter may classify the outgoing packets to the Internet PDU session by checking the destination IP address of the IP packet. In this manner, the non-3GPP IP packet can be delivered over the 3GPP Internet PDU session in the 3GPP access network based on a check result of the destination IP address.

In another embodiment of the invention, the processor 222 may set a source IP address of the IP packet to an IP address of the communications apparatus associated to the 3GPP Internet PDU session and set a destination IP address of the IP packet to an IP address of the N3IWF device, and may create a packet filter bounded to the 3GPP Internet PDU session where IPv4 remote address is set to the IPv4 address of N3IWF device and IPv6 remote address is set to the IPv6 address of N3IWF device. The packet filter may classify the outgoing packets to the Internet PDU session by checking the source IP address and the destination IP address of the IP packet. In this manner, the non-3GPP IP packet can be delivered over the 3GPP Internet PDU session in the 3GPP access network based on a check result of the source IP address and a check result of the destination IP address.

In yet another embodiment of the invention, the processor 222 may set a destination IP address of the IP packet to an IP address of the N3IWF device, create a packet filter bounded to the 3GPP Internet PDU session where IPv4 remote address is set to the IPv4 address of N3IWF device and IPv6 remote address is set to the IPv6 address of N3IWF device and check which state in the non-3GPP access network the communications apparatus is in. When it is determined that the communications apparatus is in the CM-IDLE state in the non-3GPP access network, the non-3GPP IP packet can be delivered over the 3GPP Internet PDU session in the 3GPP access network based on a check result of the destination IP address and the check result of the state.

Figure 10:
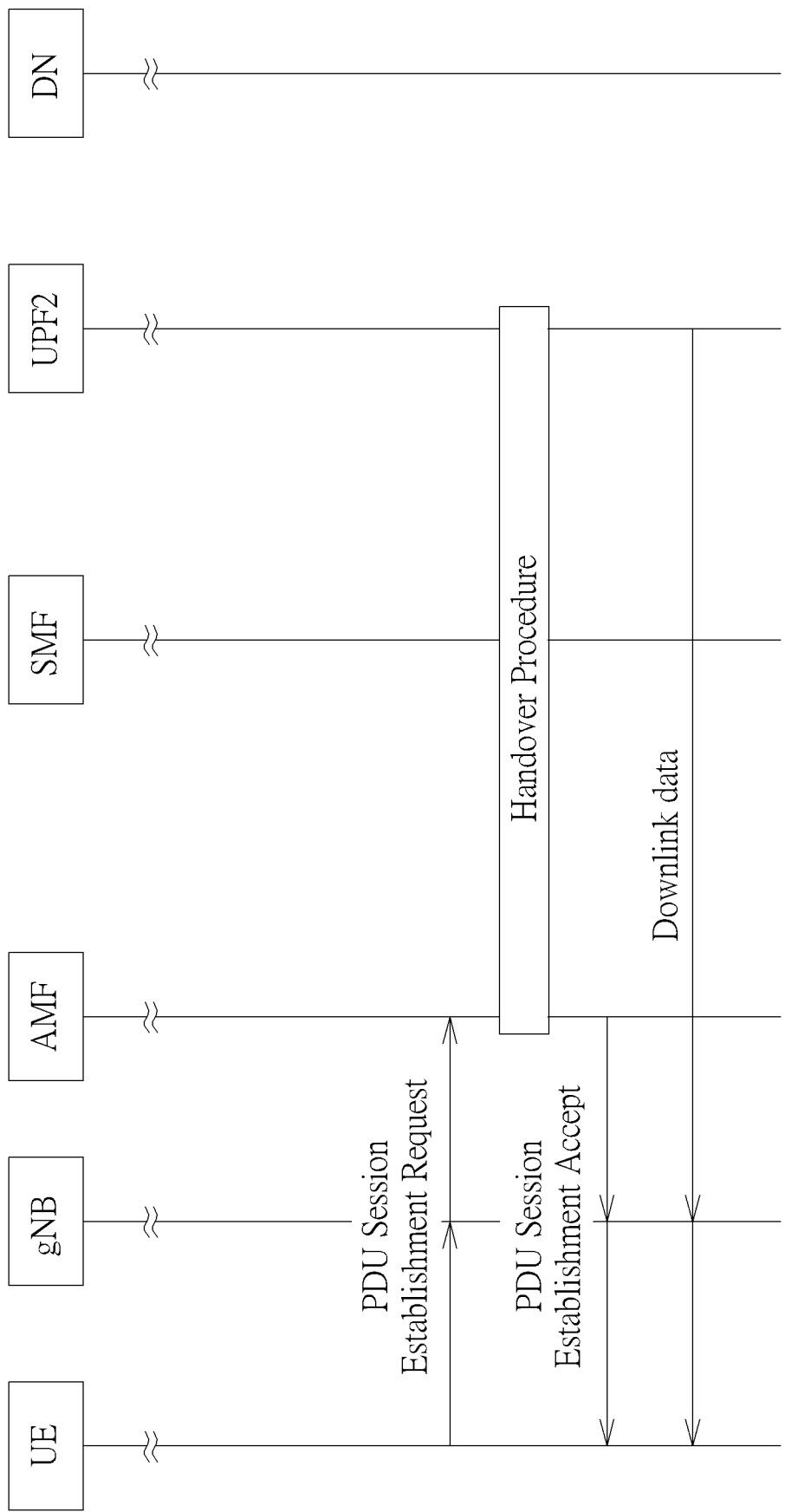
FIG. 10 is an exemplary flow chart showing the flow of the messages transmitted in the 3GPP access network for recovering a connection between the communications apparatus and the DN according to the second embodiment of the invention.
Figure 11:
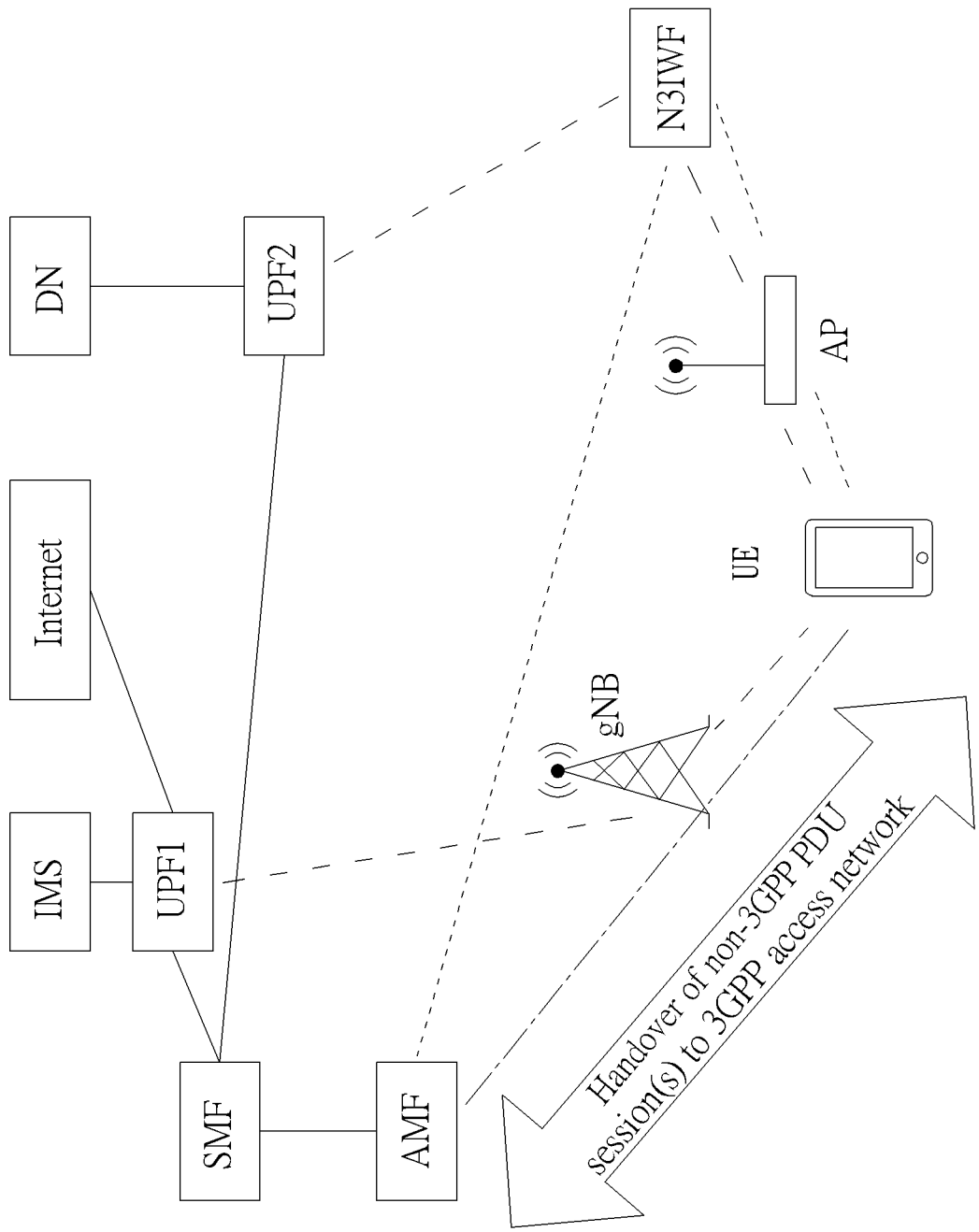
FIG. 11 is a schematic diagram showing the scenario for performing the handover of non-3GPP PDU session from the non-3GPP access network to the 3GPP access network according to the second embodiment of the invention.

FIG. 10 is an exemplary flow chart showing the flow of the messages transmitted in the 3GPP access network for recovering a connection between the communications apparatus and the DN according to the second embodiment of the invention. FIG. 11 is a schematic diagram showing the scenario for performing the handover of non-3GPP PDU session from the non-3GPP access network to the 3GPP access network according to the second embodiment of the invention.

In the second embodiment of the invention, in response to the third message, the communications apparatus may transmit the PDU session establishment request message via 5GSM protocol over the 3GPP control plane to handover the non-3GPP PDU session from the non-3GPP access network to the 3GPP access network.

It should be noted that FIG. 10 is a simplified message flow chart, in which the message flow before transmitting the session establishment request message (e.g. the session establishment request message in step S75 or the operation of "Handover of non-3GPP session(s) to 3GPP access network" in FIG. 11) is omitted for brevity. Regarding the message flow before transmitting this session establishment request message, reference may be made to FIG. 4 for the scenario when the UE is in CM-IDLE state in both 3GPP and non-3GPP access networks and made to FIG. 6 for the scenario when the UE is in CM-IDLE state in the non-3GPP access network and in CM-CONNECTED state in the 3GPP access network.

According to the second embodiment of the invention, the UE may perform the handover of the PDU session from non-3GPP access to 3GPP access by 5GSM PDU session establishment procedure. According to the standards, the purpose of the UE-requested PDU session establishment procedure is to establish a new PDU session with a DN, to perform handover of an existing PDU session between 3GPP access and non-3GPP access, to transfer an existing PDN connection in the Evolved Packet System (EPS) to the 5GS, or to transfer an existing PDN connection in an untrusted non-3GPP access connected to the Evolved Packet Core (EPC) to the 5G system (5GS). If accepted by the network, the PDU session enables exchange of PDUs between the UE and the DN. To be more specific, in an embodiment of the invention, the processor 222 may set a PDU session identity field of the PDU session establishment request message to an identity of the non-3GPP PDU session to be reestablished, and set a request type field of the PDU session establishment request message to a value corresponding to an existing PDU session. As shown in FIG. 11, the PDU session establishment request message is transmitted from the communications apparatus (e.g. the UE) to the gNB, then to the AMF device. Upon receiving the PDU session establishment request message, the AMF device may perform corresponding handover procedure as defined in 3GPP TS 23.502, FIG. 4.3.2.2.1-1 and transmit a PDU session establishment accept message to the UE to complete the handover procedure. When the handover of the non-3GPP PDU session from the non-3GPP access network to the 3GPP access network is complete, the downlink data can be transmitted from the DN through the UPF device UPF2 and the gNB then to the UE.

Besides the first and second embodiments as discussed above, according to a third embodiment of the invention, the UE may reestablish the non-3GPP PDU session over the non-3GPP access when entering/reentering the coverage area of the AP.

Figure 12:
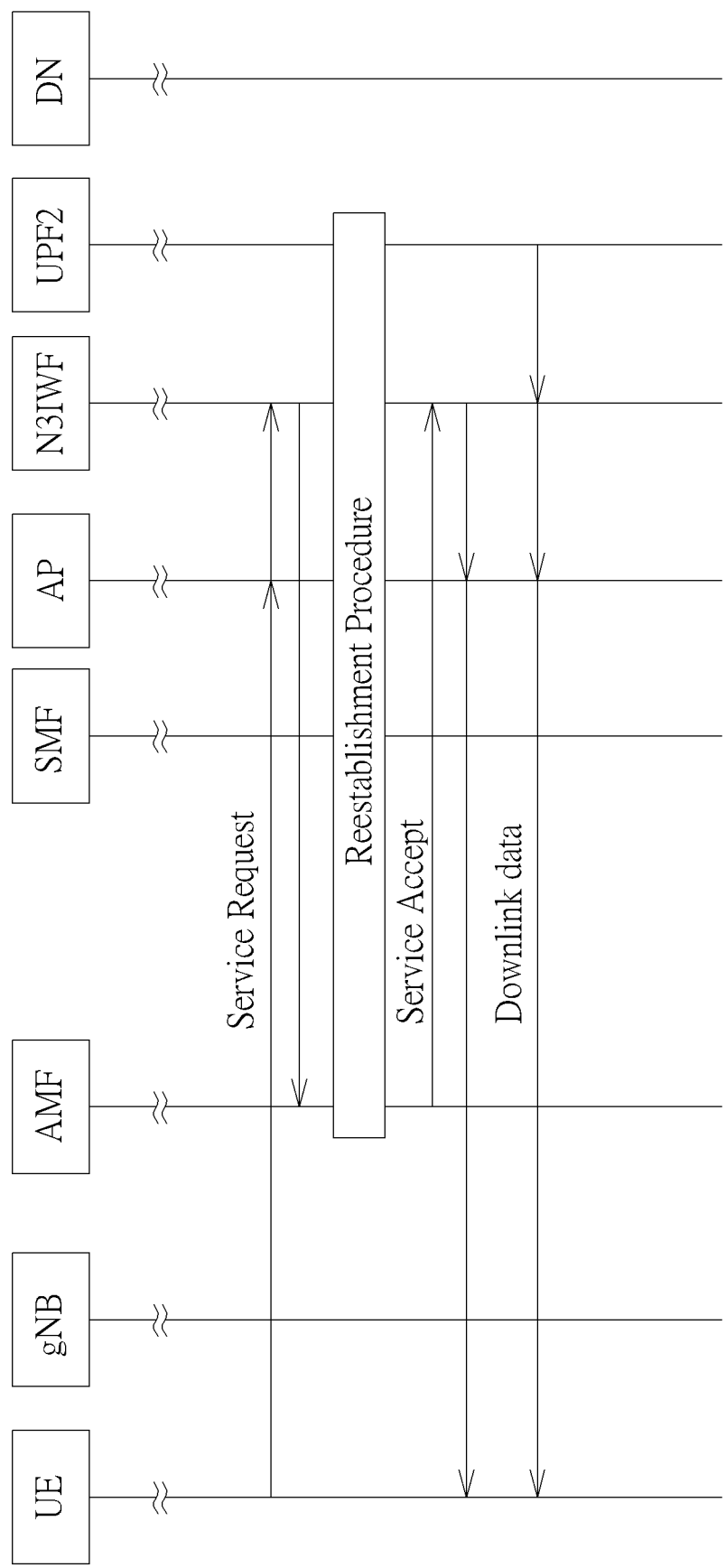
FIG. 12 is an exemplary flow chart showing the flow of the messages transmitted for recovering a connection between the communications apparatus and the DN according to the third embodiment of the invention.
Figure 13:
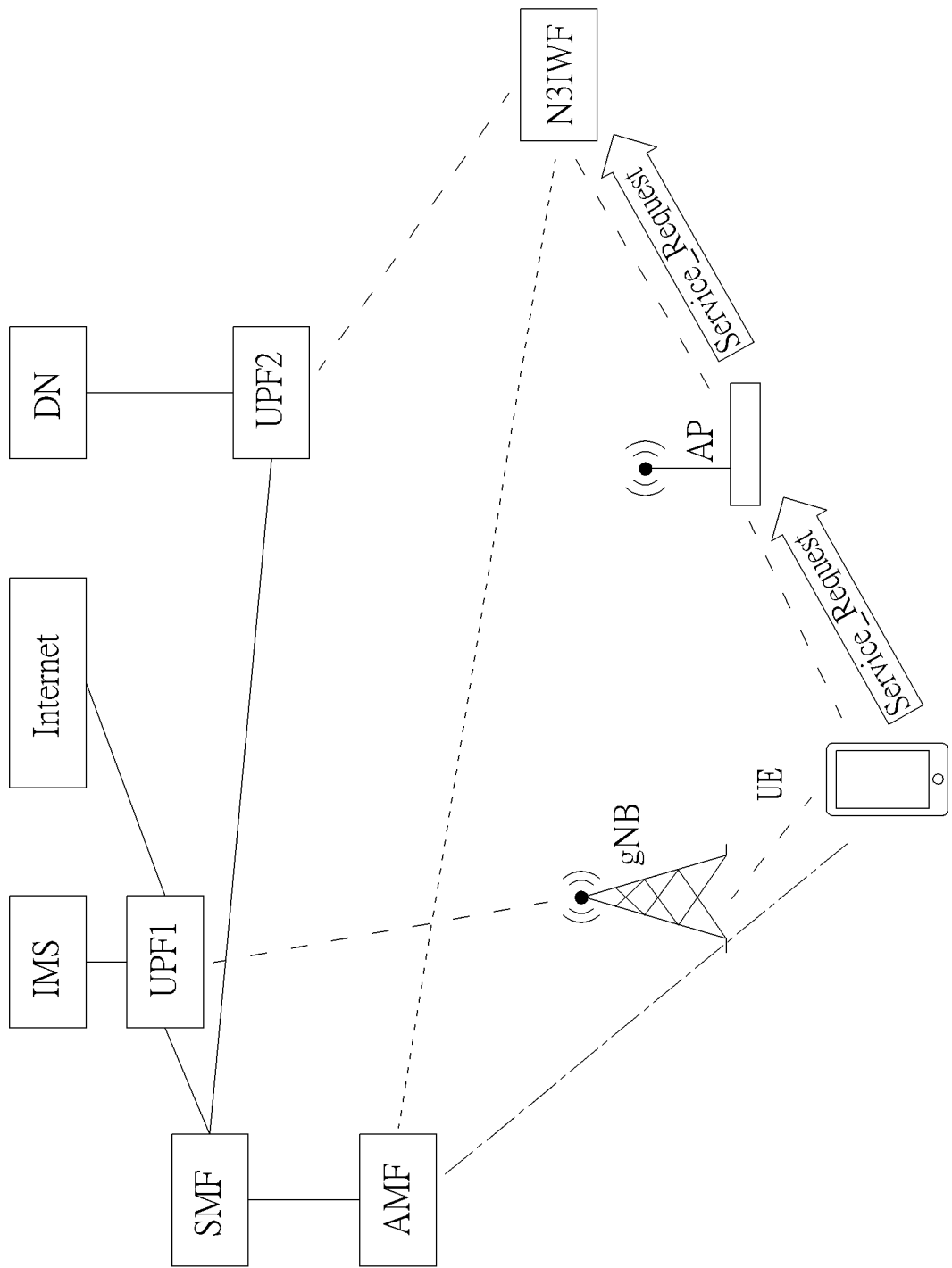
FIG. 13 is a schematic diagram showing the path for transmitting the service request message according to the third embodiment of the invention.

FIG. 12 is an exemplary flow chart showing the flow of the messages transmitted for recovering a connection between the communications apparatus and the DN according to the third embodiment of the invention. FIG. 13 is a schematic diagram showing the path for transmitting the service request message Service_Request according to the third embodiment of the invention.

In the third embodiment of the invention, in response to the third message, the communications apparatus may transmit the service request message Service_Request via the non-3GPP network device (e.g. the AP and the N3IWF device) to the 3GPP network device (e.g. the AMF device) to reestablish the non-3GPP PDU session over the non-3GPP access when entering/reentering the coverage area of the AP. According to the standards, the purpose of the service request is to request the establishment of user-plane resources for PDU sessions which are established without user-plane resources.

It should be noted that FIG. 12 is a simplified message flow chart, in which the message flow before transmitting the service request message (e.g. the service request message Service_Request in FIG. 13) is omitted for brevity. Regarding the message flow before transmitting this service request message, reference may be made to FIG. 4 for the scenario when the UE is in CM-IDLE state in both 3GPP and non-3GPP access networks and made to FIG. 6 for the scenario when the UE is in CM-IDLE state in the non-3GPP access network and in CM-CONNECTED state in the 3GPP access network.

According to the third embodiment of the invention, as shown in FIG. 12 and FIG. 13, the service request message Service_Request is transmitted from the communications apparatus (e.g. the UE) to the AP. The AP transmits the service request message Service_Request to the N3IWF device, and then the N3IWF device transmits the service request message Service_Request to the AMF device. Upon receiving the service request message Service_Request, the AMF device may perform corresponding reestablishment procedure to reestablish the non-3GPP PDU session over the non-3GPP access as defined in 3GPP TS 23.502, FIG. 4.2.3.2-1. After performing the reestablishment procedure, the AMF device may transmit a service accept message via the N3IWF device and the AP to the UE and the user plane resources for the non-3GPP PDU session may be successfully reestablished. When the user plane resources for the non-3GPP PDU session are successfully reestablished, the downlink data can be transmitted from the UPF device UPF2 via the N3IWF device and the AP to the UE.

When the user-plane resources cannot be reestablished over the 3GPP access as predicaments shown in the scenarios in FIG. 3-FIG. 6, by applying the proposed connection recovery method based on the embodiments as discussed above, the connection between the communications apparatus and the DN can be established and the UE is capable of successfully receiving the downlink data from non-3GPP access over the 3GPP access or over the non-3GPP access.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communications apparatus, comprising:
a transceiver, transmitting or receiving wireless signals to communicate with a 3rd generation partnership project (3GPP) network device; and
a processor, coupled to the transceiver and configured to perform operations comprising:
establishing a 3GPP Internet Packet Data Unit (PDU) session over a 3GPP access network and a non-3GPP PDU session over a non-3GPP access network;
receiving a first message indicating a non-3GPP access from the 3GPP network device in a Connection Management (CM)-IDLE state in the non-3GPP access network;
transmitting a second message to the 3GPP network device via 5G Mobility Management (5GMM) protocol over 3GPP control plane to establish user plane resources for the non-3GPP PDU session over the 3GPP access network in response to the first message;
receiving a third message indicating that the user plane resources for the non-3GPP PDU session over the 3GPP access network cannot be reestablished from the 3GPP network device; and
transmitting to the 3GPP network device a service request message via the 5GMM protocol over the 3GPP Internet PDU session of 3GPP user plane to reestablish the user plane resources for the non-3GPP PDU session over the 3GPP access network in response to the third message, or a PDU session establishment request message via 5G Session Management (5GSM) protocol over the 3GPP control plane to handover the non-3GPP PDU session from the non-3GPP access network to the 3GPP access network in response to the third message.

2. The communications apparatus of claim 1, wherein when the communications apparatus is in a CM-IDLE state in the 3GPP access network, the first message is a paging message, the second message is a registration request message or another service request message, and the third message is a registration accept message or a service accept message.

3. The communications apparatus of claim 1, wherein when the communications apparatus is in a CM-Connected state in the 3GPP access network, the first message is a notification message, the second message is another service request message, and the third message is a service accept message.

4. The communications apparatus of claim 1, wherein when the service request message is transmitted to the 3GPP network device via the 5GMM protocol over the 3GPP Internet PDU session of the 3GPP user plane, the service request message is transmitted as an internet protocol (IP) packet in the 3GPP access network.

5. The communications apparatus of claim 4, wherein in the step of transmitting to the 3GPP network device the service request message via the 5GMM protocol over the 3GPP Internet PDU session of the 3GPP user plane, the processor further performs operations comprising:
setting a destination IP address of the IP packet to an IP address of a Non-3GPP Inter Working Function (N3IWF) device;
checking the destination IP address of the IP packet; and
delivering the IP packet over the 3GPP Internet PDU session in the 3GPP access network based on a check result of the destination IP address.

6. The communications apparatus of claim 5, wherein in the step of transmitting to the 3GPP network device the service request message via the 5GMM protocol over the 3GPP Internet PDU session of the 3GPP user plane, the processor further performs operations comprising:
setting a source IP address of the IP packet to an IP address of the communications apparatus associated to the 3GPP Internet PDU session; and
checking the source IP address of the IP packet,
wherein the step of delivering the IP packet over the 3GPP Internet PDU session in the 3GPP access network is further based on a check result of the source IP address.

7. The communications apparatus of claim 5, wherein in the step of transmitting to the 3GPP network device the service request message via the 5GMM protocol over the 3GPP Internet PDU session of the 3GPP user plane, the processor further performs operations comprising:
checking which state in the non-3GPP access network the communications apparatus is in,
wherein the step of delivering the IP packet over the 3GPP Internet PDU session in the 3GPP access network is further based on a check result of the state.

8. The communications apparatus of claim 1, wherein in the step of transmitting the PDU session establishment request message via the 5GSM protocol over the 3GPP control plane, the processor further performs operations comprising:
setting a PDU session identity field of the PDU session establishment request message to an identity of the non-3GPP PDU session; and
setting a request type field of the PDU session establishment request message to a value corresponding to an existing PDU session.

9. A connection recovery method for recovering a connection between a communications apparatus and a data network after failure of establishment of user plane resources for a non-3rd generation partnership project (3GPP) Packet Data Unit (PDU) session over a 3GPP access network, wherein the connection recovery method is performed by a processor of the communications apparatus and comprises:
establishing a 3GPP Internet PDU session over the 3GPP access network and the non-3GPP PDU session over a non-3GPP access network;
receiving a first message indicating a non-3GPP access from the 3GPP network device in a Connection Management (CM)-IDLE state in the non-3GPP access network;
transmitting a second message to the 3GPP network device via 5G Mobility Management (5GMM) protocol over 3GPP control plane to establish the user plane resources for the non-3GPP PDU session over the 3GPP access network in response to the first message;
receiving a third message indicating that the user plane resources for the non-3GPP PDU session over the 3GPP access network cannot be reestablished from the 3GPP network device; and
transmitting to the 3GPP network device a service request message via the 5GMM protocol over the 3GPP Internet PDU session of 3GPP user plane to reestablish the user plane resources for the non-3GPP PDU session over the 3GPP access network in response to the third message, or a PDU session establishment request message via 5G Session Management (5GSM) protocol over the 3GPP control plane to handover the non-3GPP PDU session from the non-3GPP access network to the 3GPP access network in response to the third message.

10. The connection recovery method of claim 9, wherein when the communications apparatus is in a CM-IDLE state in the 3GPP access network, the first message is a paging message, the second message is a registration request message or another service request message, and the third message is a registration accept message or a service accept message.

11. The connection recovery method of claim 9, wherein when the communications apparatus is in a CM-Connected state in the 3GPP access network, the first message is a notification message, the second message is another service request message, and the third message is a service accept message.

12. The connection recovery method of claim 9, wherein when the service request message is transmitted to the 3GPP network device via the 5GMM protocol over the 3GPP Internet PDU session of the 3GPP user plane, the service request message is transmitted as an internet protocol (IP) packet in the 3GPP access network.

13. The connection recovery method of claim 12, wherein the step of transmitting to the 3GPP network device the service request message via the 5GMM protocol over the 3GPP Internet PDU session of the 3GPP user plane to reestablish the user plane resources for the non-3GPP PDU session over the 3GPP access network further comprises:
  setting a destination IP address of the IP packet to an IP address of a Non-3GPP Inter Working Function (N3IWF) device;
  checking the destination IP address of the IP packet; and
  delivering the IP packet over the 3GPP Internet PDU session in the 3GPP access network based on a check result of the destination IP address.

14. The connection recovery method of claim 13, wherein the step of transmitting to the 3GPP network device the service request message via the 5GMM protocol over the 3GPP Internet PDU session of the 3GPP user plane further comprises:
  setting a source IP address of the IP packet to an IP address of the communications apparatus associated to the 3GPP Internet PDU session; and
  checking the source IP address of the IP packet,
  wherein the step of delivering the IP packet over the 3GPP Internet PDU session in the 3GPP access network is further based on a check result of the source IP address.

15. The connection recovery method of claim 13, wherein the step of transmitting to the 3GPP network device the service request message via the 5GMM protocol over the 3GPP Internet PDU session of the 3GPP user plane further comprises:
  checking which state in the non-3GPP access network the communications apparatus is in,
  wherein the step of delivering the IP packet over the 3GPP Internet PDU session in the 3GPP access network is further based on a check result of the state.

16. The connection recovery method of claim 9, wherein in the step of transmitting the PDU session establishment request message via the 5GSM protocol over the 3GPP control plane further comprises:
  setting a PDU session identity field of the PDU session establishment request message to an identity of the non-3GPP PDU session; and
  setting a request type field of the PDU session establishment request message to a value corresponding to an existing PDU session.

* * * * *